United States Patent [19]

Wiedmann

[11] 3,729,719

[45] Apr. 24, 1973

[54] STORED CHARGE STORAGE CELL USING A NON LATCHING SCR TYPE DEVICE

[75] Inventor: Siegfried K. Wiedmann, Poughkeepsie, N.Y.

[73] Assignee: International Business Machines Corporation, Armonk, N.Y.

[22] Filed: Nov. 27, 1970

[21] Appl. No.: 92,960

[52] U.S. Cl. ............340/173 CA, 307/238, 307/235, 340/173 R

[51] Int. Cl. ..........................G11c 11/24, G11c 11/40

[58] Field of Search ..................340/173 FF, 173 CA, 340/173 R; 307/238, 305

[56] References Cited

UNITED STATES PATENTS 3,295,031 12/1966 Schmitz ..........................340/173 FF 3,475,735 10/1969 Archer.............................340/173 R

OTHER PUBLICATIONS

General Electric Transistor Manual, 1962, Bistable Memory Element, p. 364

Schuenemann, Storage Matrix, IBM Technical Disclosure Bulletin, 10/68, Vol. 11 No. 5, p. 443

*Primary Examiner*—Bernard Konick
*Assistant Examiner*—Stuart Hecker
*Attorney*—Hanifin and Jancin and James E. Murray

[57] ABSTRACT

This specification discloses a stored charge storage cell for monolithic memories. The cell comprises a device akin to a silicon-controlled rectifier and can be schematically illustrated as an NPN and a PNP transistor connected together in what is commonly called a hook circuit. A fixed potential is applied to the semiconductor zone of the device not commonly used as a terminal for a silicon-controlled rectifier so that the cell is prevented from latching as a silicon-controlled rectifier or hook circuit would normally latch. The charge on the capacitance of collector-base PN junctions of the NPN and PNP transistors is then controlled to store data in the cell.

7 Claims, 3 Drawing Figures

INVENTOR
SIEGFRIED K. WIEDMANN
BY James E. Murray
ATTORNEY

STORED CHARGE STORAGE CELL USING A NON LATCHING SCR TYPE DEVICE

BACKGROUND OF THE INVENTION

This invention relates to monolithic memories and more particularly to such memories made up of what are called stored charge storage cells as opposed to bistable storage cells.

In the monolithic memory it is desirable to reduce the number of components making up a storage cell in the memory to a minimum since this reduces the number of processing steps needed to make the cell and also reduces the area the cell takes up on the monolithic chip. One type of device which is quite simple structurally and has bistable characteristics is a circuit consisting of an NPN and a PNP transistor with the base of each connected to the collector of the other. This circuit is commonly referred to as a hook circuit and is considered to be a silicon-controlled rectifier. This hook circuit or silicon-controlled rectifier would appear ideal for storage purposes since it is inherently bistable. However, in fact, the hook circuit has many shortcomings when used as a memory cell. One shortcoming of using the hook circuit as a storage cell is that it is extremely difficult to write or read in a selected cell without having the data in unselected cells changed by the half select drive pulses or by the output sense signals. Another problem is the slow operating speed of the circuit particularly during a write operation.

In accordance with the present invention these difficulties with the structure of the hook circuit are overcome enabling the structure to be used quite effectively as a memory element. This is done by fixing the potential at the diffusion of the hook circuit normally not used as a terminal when the hook circuit is employed as a silicon-controlled rectifier. Fixing the potential in this manner prevents the hook circuit from latching. Then, instead of using the inherent bistable nature of the hook circuit to store data, data is stored in the structure by storing charge on the inherent capacitance of the collector base PN junctions of the NPN and PNP transistors. This capacitance can be increased by enlarging the junction areas or applying heavy doping to the diffusions.

Therefore, it is an object of the present invention to provide a new stored charge storage cell.

It is another object of the invention to provide a fast operating stored charge storage cell. And, it is a further object of this invention to provide a stored charge storage cell which can be rapidly accessed for reading or writing.

DESCRIPTION OF THE DRAWINGS

These and other objects, features and advantages of the invention will be apparent from the following more particular description of a preferred embodiment of the invention as illustrated in the accompanying drawings of which

DESCRIPTION OF THE EMBODIMENT OF THE INVENTION

Figure 1:
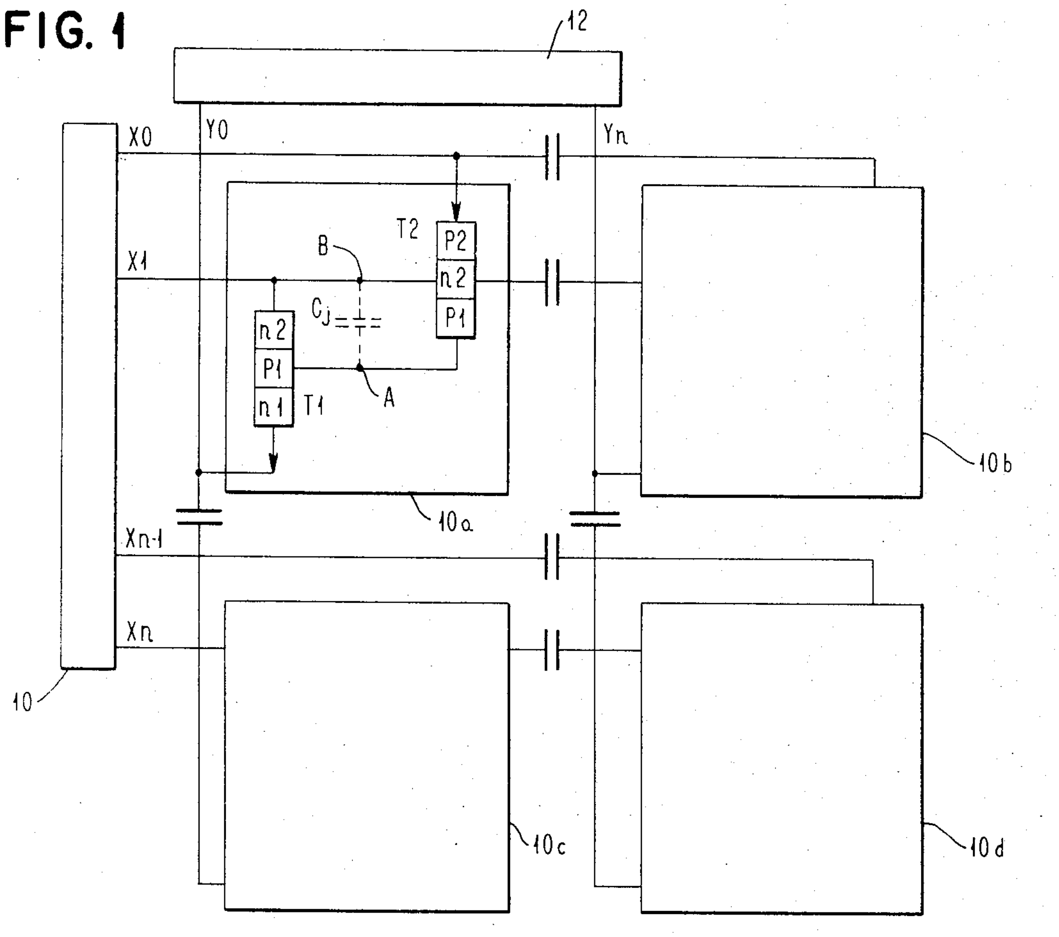
FIG. 1 is an electrical schematic of a monolithic memory fabricated in accordance with the present invention.

FIG. 1 shows a memory in which the storage cells 10 are accessed by word lines XO through X*n* and by bit lines YO through Y*n*. The cells are identical and are identically addressed in the memory. Therefore, as shown for storage cell 10*a*, each storage cell is addressed by two word lines XO and X1 and one bit line YO. The XO word line is connected to the emitter of a PNP transistor T2 while the X1 word line is connected to both the base of that PNP transistor T2 and the collector of an NPN transistor T1. The Y0 bit line is connected to the emitter of the NPN transistor T1.

The base of each transistor is connected to the collector of the other transistor in what is commonly referred to as a hook circuit. However, as will be seen from the operation of this memory cell this circuit does not latch up. Instead data is stored in the junction capacitance $C_J$ of the collector-base PN junctions of both the NPN transistor T1 and the PNP transistor T2. When this capacitance $C_J$ is discharged a binary "0" is stored in the cell and when capacitance $C_J$ is charged a binary "1" is stored in the cell.

To read data stored in the cell, the potential on the X1 word line is raised from approximately zero volts to some more positive value. This causes transistor T1 to conduct if capacitance $C_J$ is charged so that node A is slightly positive with respect to node B or approximately equal to node B. When transistor T1 conducts, charge on the capacitance $C_J$ is drained off through transistor T1 and appears as a pulse on the Y0 bit line. This amounts to destructively reading data stored in the storage cell 10*a*. If capacitance $C_J$ is negatively charged so that node A is more negative than node B (approximately 2 to 3 volts differential between nodes A and B) then transistor T1 will not turn on and there will be no signal produced on the Y0 bit line when the X1 word line is raised above ground level. Of course, to the sense amplifiers associated with the memory the presence of a signal on the Y0 bit line means that a "1" is stored in the storage cell while the absence of a signal on the Y0 bit line is interpreted as a "0" being stored in the storage cell 10*a*.

A write operation is performed on a word line by raising the X1 word line from zero to some positive value and by simultaneously supplying current from a current source to the X0 word line so that all the cells on the word line are fed current through transistor T2. To those cells in which a "0" is to be written, the Y0 bit line for the cell is left at zero potential so that transistor T1 conducts the current coming from the X0 word line to the Y0 bit line thereby causing node A to assume a negative potential (approximately 2 to 3 volts) with respect to node B. In those cells of the word line in which a "1" is to be stored the Y0 bit line is raised from zero to some positive potential biasing transistor T1 off causing node A to assume a positive potential (approximately 2 volts) with respect to node B.

As pointed out previously, this storage cell is a non-latching storage cell and relies on the charge stored in the capacitance $C_J$ for storing the data in the cell. If the charge on the capacitance $C_J$ is not periodically restored, it will be dissipated and the data stored in the memory will be lost. For this reason the data must be periodically regenerated. This can be accomplished by periodically reading the data out of the cells and then writing it back into the cells so that regeneration essentially is a read operation followed by a write operation. Since both of these operations have been previously described no further description will be supplied here.

We have now described one way of reading and writing data and regenerating the data in the storage cell 10*a*. An alternative way of writing data into the cell involves first performing destructive read operation on the selected word line to write a "0" into each of the cells. This write "0" operation is the same as the described destructive read operation and is simultaneously performed on all the storage cells connected to the X1 word line. A description of this write "0" operation will not be repeated here since it would be repetitious of the read operation previously described. In this alternative way of writing, a "1" is written into the storage cell 10*a* after the write "0" operation. This is done by applying a slightly negative potential to the X1 word line while current from the current source is supplied to the emitter of the transistor T2 in all cells into which a "1" is to be written. To operate the cell in this manner the X0 word line would have to be extended orthogonally with respect to the X1 word line or, in other words, parallel to the Y0 bit line.

The bit drivers, word drivers and sense amplifiers of this memory have been shown here as blocks 10 and 12. The reason for this is that they do not constitute part of the invention and there are any number of suitable word drivers, bit drivers and sense amplifiers in the prior art.

Figures 2, 3:
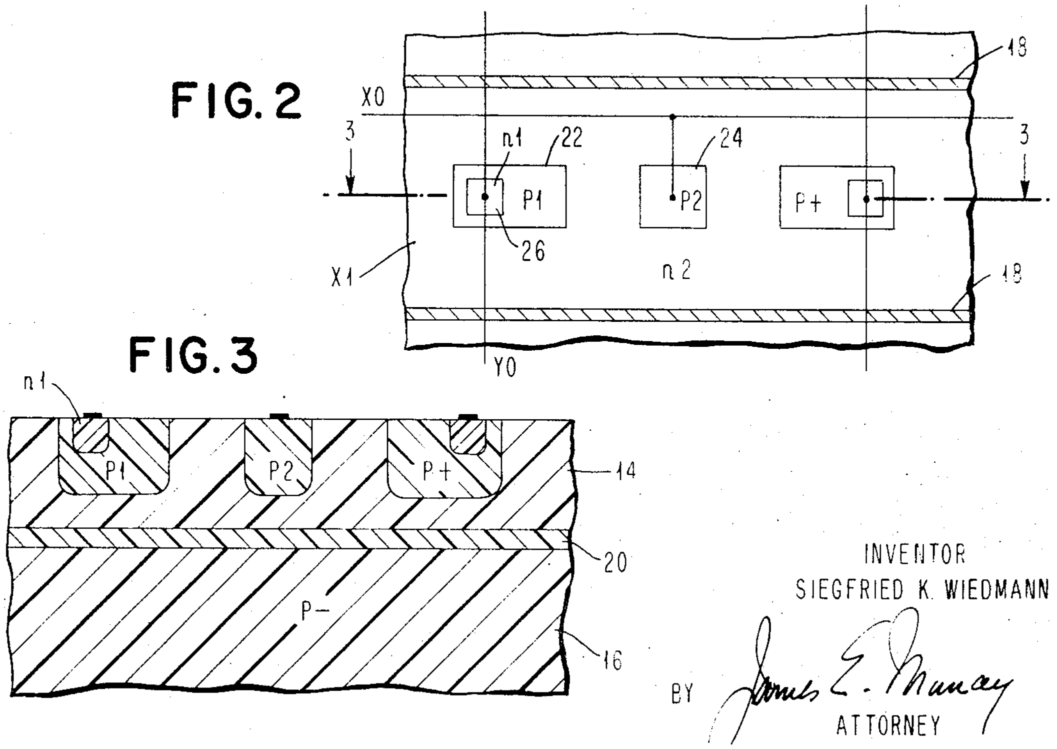
FIG. 2 is a plan view of the monolithic layout for the storage cell in the memory of FIG. 1.
FIG. 3 is a sectional view taken along lines 3—3 in FIG. 2.

Referring to FIGS. 2 and 3, it can be seen how the storage cell 10a of FIG. 1 could be monolithically fabricated. As shown in FIGS. 2 and 3, an N epitaxial layer 14 is grown on a P− substrate 16. Junction diffusions 18 divide this P− substrate into channels and in each channel a buried N+ subcollector runs underneath the epitaxial layer 14 along the length of the channel. This subcollector forms the X1 word line for addressing of storage cell 10*a*. The channels contain two P diffusions 22 and 24 for each cell of the word line where P diffusion 24 functions in two adjacent cells. One of the P diffusions 22 contains an N diffusion 26. This N diffusion 26 functions as the emitter of transistor T1 while the P diffusion containing it serves as the base of transistor T1 and the collector of transistor T2. The portion of the epitaxial layer will not be in the channel and therefore is the collector of transistor T1 and the base of transistor T2 and the remaining P diffusion 24 connected to the X0 word line and serves as the emitter of transistor T2. The described fabrication scheme is for the first disclosed mode of cell operation. No structure is shown for the alternative mode of operation.

While the invention has been particularly shown and described with reference to the preferred embodiment thereof, it will be understood by those skilled in the art that various changes in form and detail may be made therein without departing from the spirit and scope of the invention.

What is claimed is:

1. In a memory cell having a PNP and NPN bipolar transistor with the base of each transistor connected to the collector of the other to form a bistable combination with a latched and unlatched operating state, an improved method of storing binary data comprising the steps of:

preventing the bistable combination from entering its latched operating state irrespective of which state of binary data is stored in the storage cell by controlling the potential at the collector of one of the transistors and the base of the other transistor; and while the bistable combination is so prevented from entering its latched state charging and discharging the capacitance of the base-collector PN junction of the PNP and NPN transistors to store either state of binary data in the form of charge on the capacitance and to read data so stored out of the storage cell.

2. In a matrix of stored charge memory cells each addressed by the selection of a plurality of lines out of a grid of addressing lines, a new storage cell for binary data comprising:

a. a PNP and an NPN bipolar transistor with the base of each transistor connected to the collector of the other to form a bistable combination with a latched and unlatched operating state;

b. a first addressing means for preventing the bistable combination from entering its latched operating state irrespective of the state of the binary data stored in the storage cell, said first addressing means being coupled to the collector of the NPN transistor and the base of the PNP transistor; and c. second and third addressing means for charging the capacitance of base-collector PN junction of the PNP and NPN transistors to a first potential to store one state of binary data and to a second potential to store the other state of binary data while the bistable combination is maintained in its unlatched operating state by the first addressing means and on reading data so stored out of the cell while the bistable combination operates only in its unlatched operating state, said second and third addressing means being connected to the emitters of the PNP and NPN transistors.

3. The storage cell of claim 2 wherein said first addressing means is coupled to the collector of the NPN transistor and the base of the PNP transistor and is maintained at fixed potential levels that prevent the bistable combination from latching.

4. The storage cell of claim 3 wherein the collector, base and emitter of said NPN transistor comprise, respectively, an epitaxial layer, a first diffusion in that epitaxial layer, a second diffusion in the first diffusion and the collector, base and emitter of the PNP transistor comprise, respectively, said first diffusion, the epitaxially grown layer and a third diffusion spaced from the first diffusion.

5. The storage cell of claim 4 wherein the first addressing means includes a conductive subcollector under the epitaxial layer, the second addressing means includes a conductor connected to the third diffusion and the third addressing means includes a conductor connected to the second diffusion.

6. The storage cell of claim 3 wherein said second addressing means is coupled to the emitter of the PNP transistor for providing current to that emitter when data is being written into the storage cell and the third addressing means is coupled to the emitter of the NPN transistor for reading data out of the storage cell.

7. The storage cell of claim 6 wherein the first addressing means is for raising the potential at the collector of the NPN transistor to read the data stored into the storage cell onto the third addressing means by turning on the NPN transistor when the said PN junction is properly biased and leaving said NPN transistor off when said PN junction is not so biased.

* * * * *